United States Patent
Kammachi-Sreedhar et al.

(10) Patent No.: US 11,651,752 B2
(45) Date of Patent: May 16, 2023

(54) METHOD AND APPARATUS FOR SIGNALING USER INTERACTIONS ON OVERLAY AND GROUPING OVERLAYS TO BACKGROUND FOR OMNIDIRECTIONAL CONTENT

(71) Applicant: Nokia Technologies Oy, Espoo (FI)

(72) Inventors: Kashyap Kammachi-Sreedhar, Tampere (FI); Igor Curcio, Tampere (FI); Miska Hannuksela, Tampere (FI); Sujeet Shyamsundar Mate, Tampere (FI); Emre Aksu, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/057,815

(22) PCT Filed: May 31, 2019

(86) PCT No.: PCT/FI2019/050418
§ 371 (c)(1),
(2) Date: Nov. 23, 2020

(87) PCT Pub. No.: WO2019/229304
PCT Pub. Date: Dec. 5, 2019

(65) Prior Publication Data
US 2021/0201855 A1    Jul. 1, 2021

Related U.S. Application Data

(60) Provisional application No. 62/694,459, filed on Jul. 6, 2018, provisional application No. 62/679,240, filed on Jun. 1, 2018.

(51) Int. Cl.
*G09G 5/377* (2006.01)
*G06F 3/01* (2006.01)
(Continued)

(52) U.S. Cl.
CPC ............. *G09G 5/377* (2013.01); *G06F 3/011* (2013.01); *G09G 2340/125* (2013.01);
(Continued)

(58) Field of Classification Search
CPC ............. H04N 21/4728; H04N 13/156; H04N 13/117; H04N 21/4725; H04N 13/183;
(Continued)

(56) References Cited

U.S. PATENT DOCUMENTS 8,087,044 B2   12/2011  Krause et al.
8,752,113 B1   6/2014  Good et al.
(Continued)

FOREIGN PATENT DOCUMENTS

CN    104219559 A    12/2014
EP     0762297 A2    3/1997
(Continued)

OTHER PUBLICATIONS

Wang et al., "WD 1 of ISO/IEC 23090-2 OMAF 2nd edition", ISO/IEC JTC1/SC29/WG11, N17584, Systems, Apr. 2018, 191 pages.
(Continued)

*Primary Examiner* — Jacinta M Crawford
*Assistant Examiner* — Andrew Shin
(74) *Attorney, Agent, or Firm* — Alston & Bird LLP

(57) ABSTRACT

A method, apparatus and computer program product describing groups of overlays, such as semantically correlated overlays, to background media content. In the context of a method, a group of overlays to background media content is defined by metadata (60). The overlays include semantically correlated overlays having alternative overlays representing content with different levels of detail or overlays providing different choices of content. The method also includes receiving client selection of a respective overlay from a group of overlays (62). In response to the client selection, the method causes the respective overlay to be provided. The respective overlay is received (64) for presentation concurrent with background media content (68).

22 Claims, 7 Drawing Sheets

US 11,651,752 B2

Page 2

(51) Int. Cl.
H04N 21/431 (2011.01)
H04N 21/435 (2011.01)
H04N 21/81 (2011.01)

(52) U.S. Cl.
CPC ..... G09G 2354/00 (2013.01); G09G 2370/20 (2013.01); H04N 21/435 (2013.01); H04N 21/4316 (2013.01); H04N 21/816 (2013.01)

(58) Field of Classification Search
CPC .. H04N 21/435; H04N 13/366; H04N 21/816; H04N 21/4316; H04N 13/161; H04N 13/178; H04N 13/344; H04N 21/21805; G09G 5/14; G09G 5/377; G09G 2340/125; G09G 2350/00; G09G 2354/00; G09G 2370/20; G09G 2370/022; G06F 3/147; G06F 3/011
See application file for complete search history.

(56) References Cited

U.S. PATENT DOCUMENTS

| | | | |
|---|---|---|---|
| 2012/0092327 A1 | 4/2012 | Adhikari | |
| 2014/0359656 A1* | 12/2014 | Banica | H04N 21/234 725/32 |
| 2015/0077416 A1 | 3/2015 | Villmer | |
| 2015/0128174 A1* | 5/2015 | Rango | H04N 21/21805 725/34 |
| 2015/0271553 A1 | 9/2015 | Pomeroy et al. | |
| 2016/0073155 A1 | 3/2016 | Subramaniam et al. | |
| 2018/0063505 A1 | 3/2018 | Lee et al. | |

FOREIGN PATENT DOCUMENTS

| | | | | |
|---|---|---|---|---|
| EP | 3 193 286 A1 | 7/2017 | | |
| WO | 2016/183251 A1 | 11/2016 | | |
| WO | WO-2017096517 A1 * | 6/2017 | ......... | H04N 21/2187 |
| WO | WO 2018/038520 A1 | 3/2018 | | |
| WO | 2019/141901 A1 | 7/2019 | | |
| WO | 2019/141907 A1 | 7/2019 | | |
| WO | 2019/193251 A1 | 10/2019 | | |

OTHER PUBLICATIONS

Koenen et al., "Requirements MPEG-I phase 1b", ISO/IEC JTC1/SC29/WG11, N 17331, Requirements, Jan. 2018, 8 pages.
"Information Technology—Coding of Audio-Visual Objects—Part 12: ISO Base Media File Format", ISO/IEC 14496-12, Fifth edition, Dec. 15, 2015, 248 pages.
"Information Technology—Dynamic Adaptive Streaming over HTTP (DASH)—Part 1: Media Presentation Description and Segment Formats", ISO/IEC 23009-1, Draft third edition, Jan. 9, 2017, 218 pages.
Kammachi-Sreedhar et al., "[OMAF] A Framework for Overlays", ISO/IEC JTC1/SC29/WG11 MPEG2018/M42495, Nokia, Apr. 2018, 8 pages.
"Information Technology—Coding of Audio-Visual Objects—Part 14: MP4 file format", ISO/IEC 14496-14, First Edition, Nov. 15, 2003, 18 pages.
"Information Technology—Coding of Audio-Visual Objects—Part 15: Advanced Video Coding (AVC) File Format", ISO/IEC 14496-15, Second Edition, Jun. 1, 2010, 96 pages.
"High Efficiency Video Coding", Series H: Audiovisual and Multimedia Systems, Infrastructure of audiovisual services—Coding of moving video, Recommendation ITU-T H.265, Feb. 2018, 692 pages.
Wang et al., "[OMAF] Editor's Input Text for OMAF WD Based on Finland AHG Agreements", ISO/IEC JTC1/SC29/WG11/M42923-v1, OMAF v2 Editors, Jul. 2018, 203 pages.
Wang et al., "WD 4 of ISO/IEC 23090-2 OMAF 2nd edition", ISO/IEC JTC1/SC29/WG11, N18227-v1, Systems, Jan. 2019, 226 pages.
International Search Report and Written Opinion received for corresponding Patent Cooperation Treaty Application No. PCT/FI2019/050418, dated Dec. 13, 2019, 16 pages.
Salmimaa et al., "Live Delivery of Neurosurgical Operating Theater Experience in Virtual Reality", The Journal of the Society for Information Display, vol. 26, No. 2, Feb. 2018, pp. 98-104.
Wijnants et al., "Web-mediated Augmentation and Interactivity Enhancement of Omni-directional Video in Both 2D and 3D", Proceedings of the 11th International Conference on Web Information Systems and Technologies (WEBIST), 2015, pp. 21-34.
Extended European Search Report for European Application No. 19811258.3 dated Feb. 9, 2022, 12 pages.
Office Action for Indian Application No. 202047054981 dated Dec. 29, 2021, 9 pages.
Office Action for Korean Application No. 10-2020-7037897 dated Dec. 20, 2021, 10 pages.
Thomas, E., "Spatial Alignment of OMAF Visual Content", International Organisation for Standardisation Organisation Internationale De Normalisation ISO/IEC JTC1/SC29/WG11, Coding of Moving Pictures and Audio, (Apr. 2018), 6 pages.
Office Action for Chinese Application No. 201980050372.6 dated May 27, 2022, 21 pages.
Written Decision on Registration for Korean Application No. 10-2020-7037897 dated Jun. 14, 2022, 3 pages.
Office Action for Chinese Application No. 201980050372.6 dated Jan. 9, 2023, 11 pages.

* cited by examiner

METHOD AND APPARATUS FOR SIGNALING USER INTERACTIONS ON OVERLAY AND GROUPING OVERLAYS TO BACKGROUND FOR OMNIDIRECTIONAL CONTENT

RELATED APPLICATION

This application claims priority to PCT Application No. PCT/FI2019/050418, filed on May 31, 2019, which claims priority to U.S. Provisional Application No. 62/694,459, file on Jul. 6, 2018 and U.S. Provisional Application No. 62/679,240, filed on Jun. 1, 2018, each of which is incorporated herein by reference in its entirety.

The present application claims priority to U.S. Provisional Application Ser. No. 62/679,240, titled "A METHOD AND APPARATUS FOR SEPARATELY SIGNALING USER INTERACTIONS ON OVERLAY FOR OMNIDIRECTIONAL CONTENT," filed Jun. 1, 2018, and U.S. Provisional Application Ser. No. 62/694,459, titled "METHOD AND APPARATUS FOR GROUPING OVERLAYS TO BACKGROUND MEDIA CONTENT," filed Jul. 6, 2018, the contents of which are incorporated herein by reference in their entirety.

TECHNICAL FIELD

An example embodiment relates generally to encoding media content, particularly in the context of streaming virtual reality and other audiovisual content.

BACKGROUND

Virtual reality audiovisual content, such as 360° video and other similar content, has become increasingly popular amongst viewers and content creators who prefer or otherwise enjoy the immersive viewing experience available from such content. This increase in the popularity of virtual reality content has driven viewer demand for streaming virtual reality content that provides a high-quality viewing experience.

The consumption of immersive multimedia, such as omnidirectional content consumption for virtual reality and other applications, is more complex for a client then the consumption of two-dimensional content. This increased complexity is attributable to the higher degrees of freedom available to the client when consuming immersive multimedia. Although enhancing the user experience, the higher degrees of freedom result in increased uncertainty. This increased complexity is further complicated in instances in which layers of content are rendered, such as in conjunction with rendering of one or more overlays to background media content.

The omnidirectional media application format (OMAF) version 1 (v1) standard defines omnidirectional streaming of content having three degrees of freedom. Subsequent standardization is expected to enable not only the omnidirectional streaming of content having three degrees for freedom, but to also support overlays and user interaction with overlays.

BRIEF SUMMARY

A method, apparatus and computer program product are provided in accordance with an example embodiment in order to render visual overlay(s) associated with background content.

In an example embodiment, a method is provided that comprises receiving metadata defining a group of overlays to background media content. The overlays comprise semantically correlated overlays including alternative overlays representing content with different levels of detail or overlays providing different choices of content. The method also comprises causing a selection of a respective overlay from the group of overlays to be provided. The method further comprises receiving the respective overlay for pre-sentation concurrent with the background media content.

The metadata of an example embodiment includes information regarding a bandwidth required for the alternative overlays of the group of semantically correlated overlays. Additionally or alternatively, the metadata includes information regarding the resolution of the alternative overlays of the group of semantically correlated overlays. The metadata of an example embodiment additionally or alternatively includes sequence information of the alternative overlays. The metadata of an example embodiment additionally or alternatively includes sequence information of the alternative overlays.

The method of an example embodiment may also include receiving the background media content. The background media content of an example embodiment includes omnidirectional media content. The method of this example embodiment also includes causing the omnidirectional media content and the respective overlay to be concurrently presented.

The method of an example embodiment may also include receiving a user interaction associated with the visual overlay. The method of this example embodiment also includes adjusting the rendering of the visual overlay based on the user interaction and the metadata in an instance where the flag indicates that the user interaction type is allowed.

In another example embodiment, an apparatus is provided that includes at least one processor and at least one memory including computer program code with the at least one memory and the computer program code configured to, with the at least one processor, cause the apparatus to receive metadata defining a group of overlays to background media content. The overlays comprise semantically correlated overlays including alternative overlays representing content with different levels of detail or overlays providing different choices of content. The at least one processor and the computer program code are also configured to, with the at least one processor, cause the apparatus to cause a selection of a respective overlay from the group of overlays to be provided and to receive the respective overlay for presentation concurrent with the background media content.

The metadata of an example embodiment includes information regarding a bandwidth required for the alternative overlays of the group of semantically correlated overlays. Additionally or alternatively, the metadata includes information regarding a resolution of the alternative overlays for the group of semantically correlated overlays. The metadata of an example embodiment additionally or alternatively includes information regarding a fidelity of the alternative overlays of the group of the semantically correlated overlays. The metadata of an example embodiment additionally or alternatively includes sequence information of the alternative overlays.

The at least one memory and the computer program code are further configured to, with the at least one processor, cause the apparatus of an example embodiment to receive the background media content. The background media content may include omnidirectional media content. In this example embodiment, the at least one memory and the computer code are further configured to, with the at least one processor, cause the apparatus to cause the omnidirectional media content and the respective overlay to be concurrently presented.

The at least one memory and the computer program code are further configured to, with the at least one processor, cause the apparatus of an example embodiment to receive a user interaction associated with the visual overlay. In this example embodiment, the at least one memory and the computer code are further configured to, with the at least one processor, cause the apparatus to adjust the rendering of the visual overlay based on the user interaction and the metadata in an instance where the flag indicates that the user interaction type is allowed.

In a further example embodiment, a computer program product is provided that comprises at least one non-transitory computer-readable storage medium having computer executable program code instructions stored therein with the computer executable program code instructions comprising program code instructions configured, upon execution, to receive metadata defining a group of overlays to background media content. The overlays comprise semantically correlated overlays including alternative overlays representing content with different levels of detail or overlays providing different choices of content. The computer executable program code instructions also comprise program code instructions configured, upon execution, to cause a selection of a respective overlay from the group of overlays to be provided and to receive the respective overlay for presentation concurrent with the background media content.

The metadata of an example embodiment includes information regarding a bandwidth required for the alternative overlays of the group of semantically correlated overlays. Additionally or alternatively, the metadata includes information regarding a resolution of the alternative overlays for the group of semantically correlated overlays. The metadata of an example embodiment additionally or alternatively includes information regarding a fidelity of the alternative overlays of the group of the semantically correlated overlays. The metadata of an example embodiment additionally or alternatively includes sequence information of the alternative overlays.

In an example embodiment, the computer executable program code instructions also comprise program code instructions configured, upon execution, to receive the background media content. The background media content may include omnidirectional media content. In this example embodiment, the computer executable program code instructions also comprise program code instructions configured, upon execution, to cause the omnidirectional media content and the respective overlay to be concurrently presented.

The computer executable program code instructions also comprise program code instructions configured, upon execution, in an example embodiment, to receive a user interaction associated with the visual overlay. In this example embodiment, computer executable program code instructions also comprise program code instructions configured, upon execution, to adjust the rendering of the visual overlay based on the user interaction and the metadata in an instance where the flag indicates that the user interaction type is allowed.

In yet another example embodiment, an apparatus is provided that includes means for receiving metadata defining a group of overlays to background media content. The overlays comprise semantically correlated overlays including alternative overlays representing content with different levels of detail or overlays providing different choices of content. The apparatus also includes means for causing a selection of a respective overlay from a group of overlays to be provided. The apparatus further includes means for causing a selection of a respective overlay from a group of overlays be provided. The apparatus further includes means for receiving the respective overlay for presentation concurrent with the background media content.

The metadata of an example embodiment includes information regarding a bandwidth required for the alternative overlays of the group of semantically correlated overlays. Additionally or alternatively, the metadata includes information regarding a resolution of the alternative overlays for the group of semantically correlated overlays. The metadata of an example embodiment additionally or alternatively includes information regarding a fidelity of the alternative overlays of the group of the semantically correlated overlays. The metadata of an example embodiment additionally or alternatively includes sequence information of the alternative overlays.

The apparatus of an example embodiment may also include means for receiving the background media content. The background media content of an example embodiment includes omnidirectional media content. The apparatus of this example embodiment also includes means for causing the omnidirectional media content and the respective overlay to be concurrently presented.

The apparatus of an example embodiment may also include means for receiving a user interaction associated with the visual overlay. The apparatus of this example embodiment also includes means for adjusting the rendering of the visual overlay based on the user interaction and the metadata in an instance where the flag indicates that the user interaction type is allowed.

BRIEF DESCRIPTION OF THE DRAWINGS

Figure 1B:
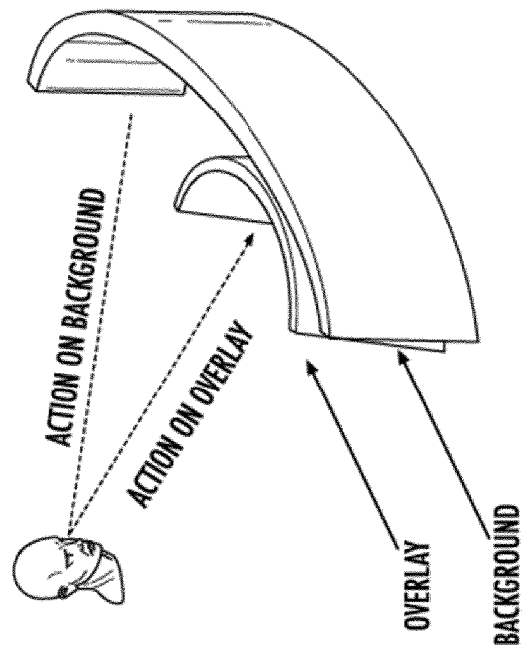
Figure 1A:
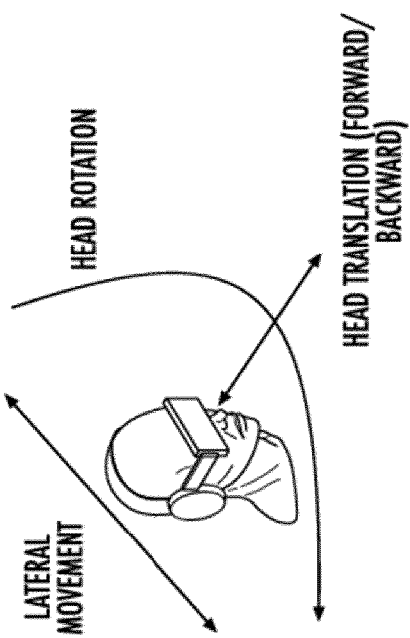
Figure 1C:
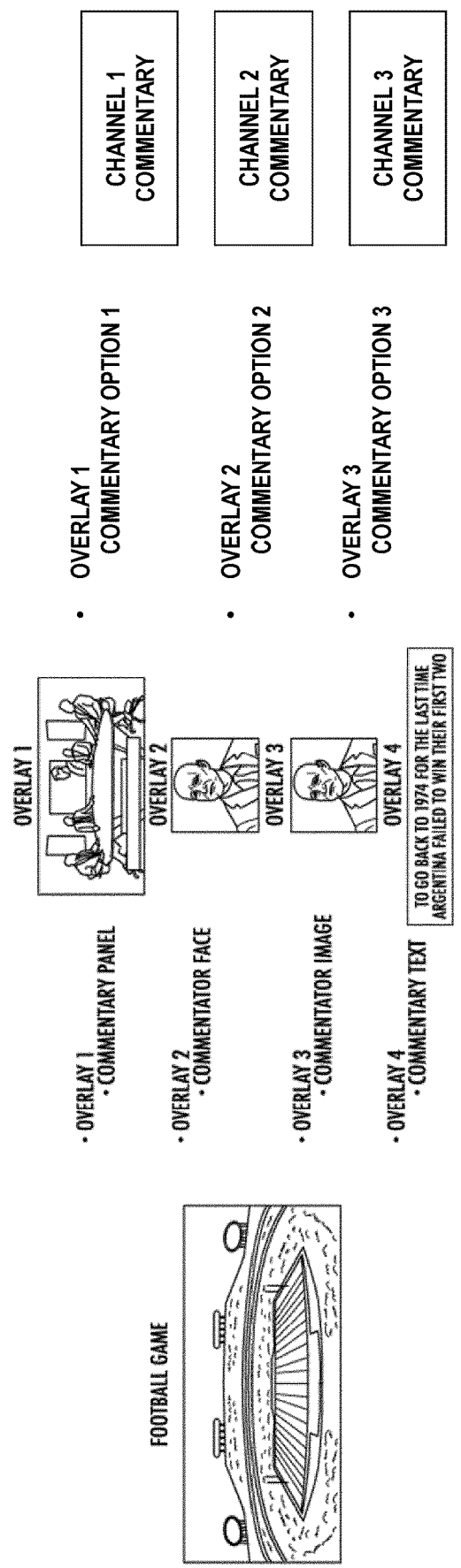
Figure 2:
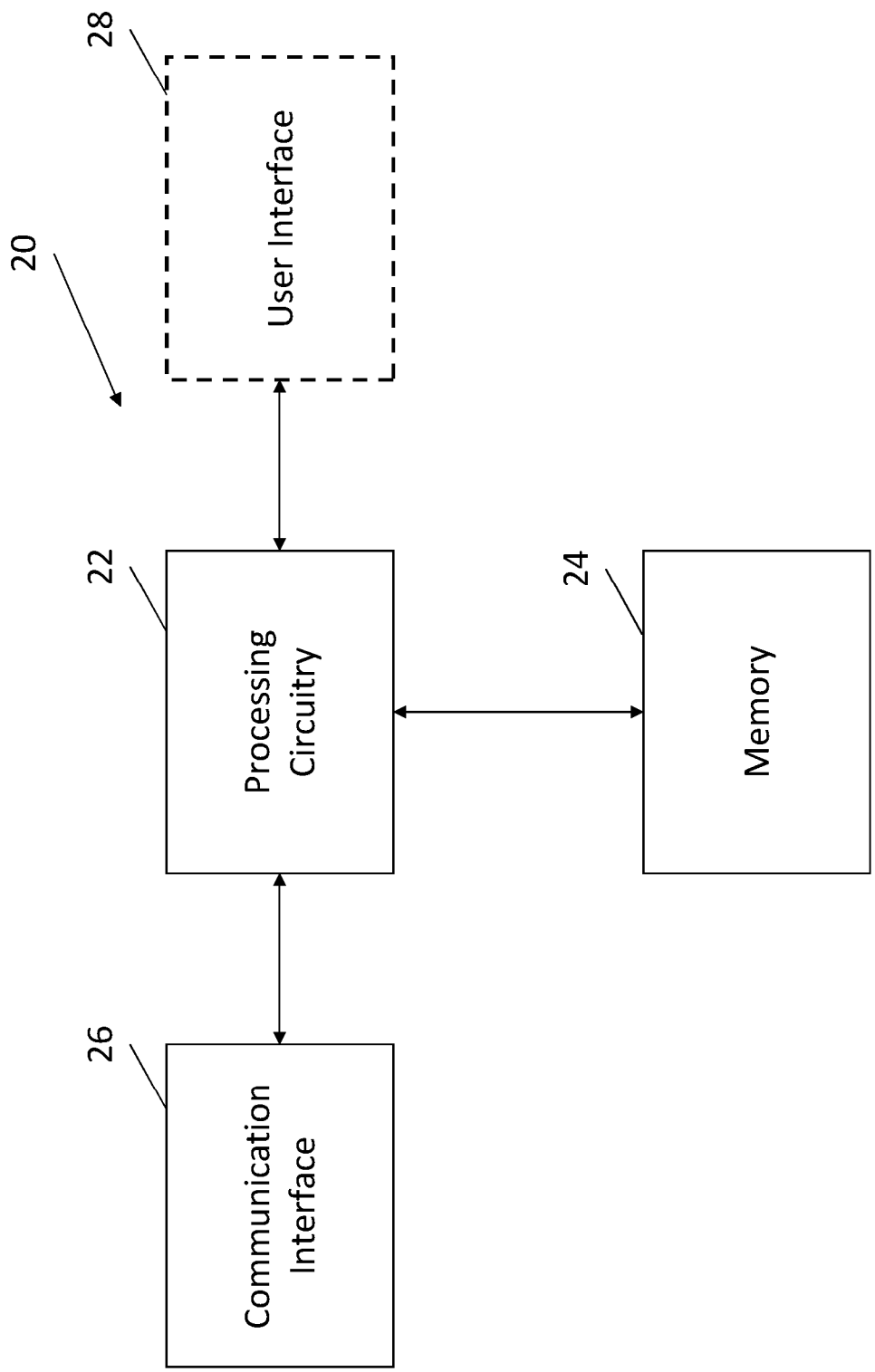
Figure 3:
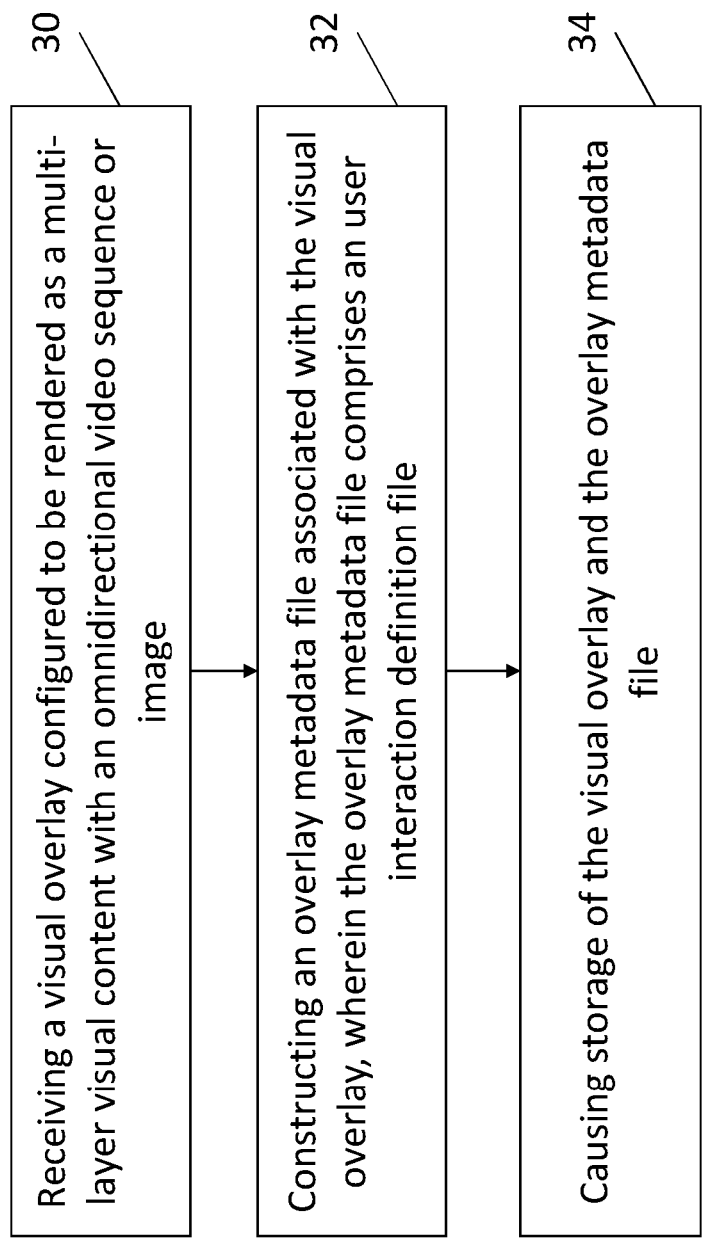
Figure 4:
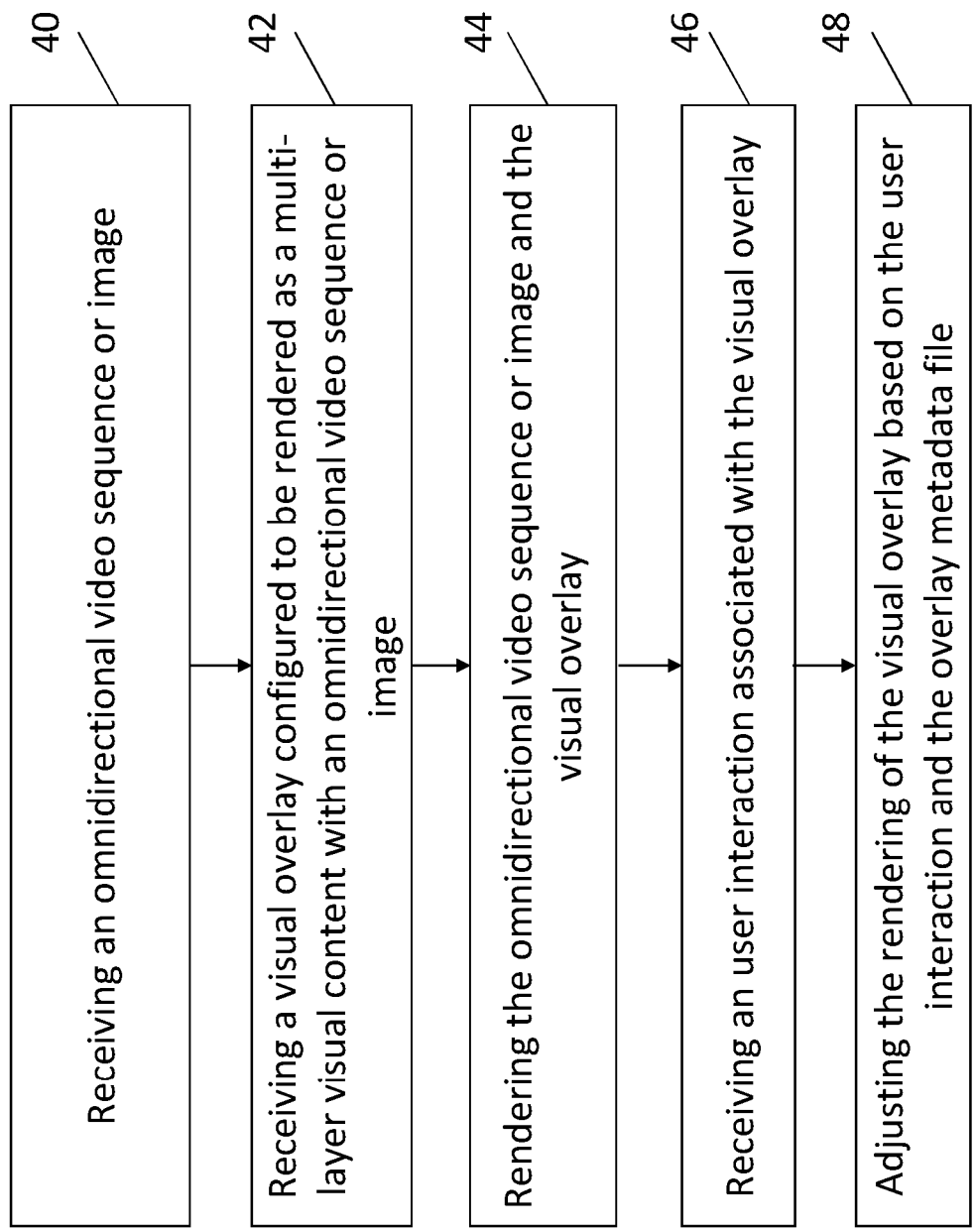
Figure 5:
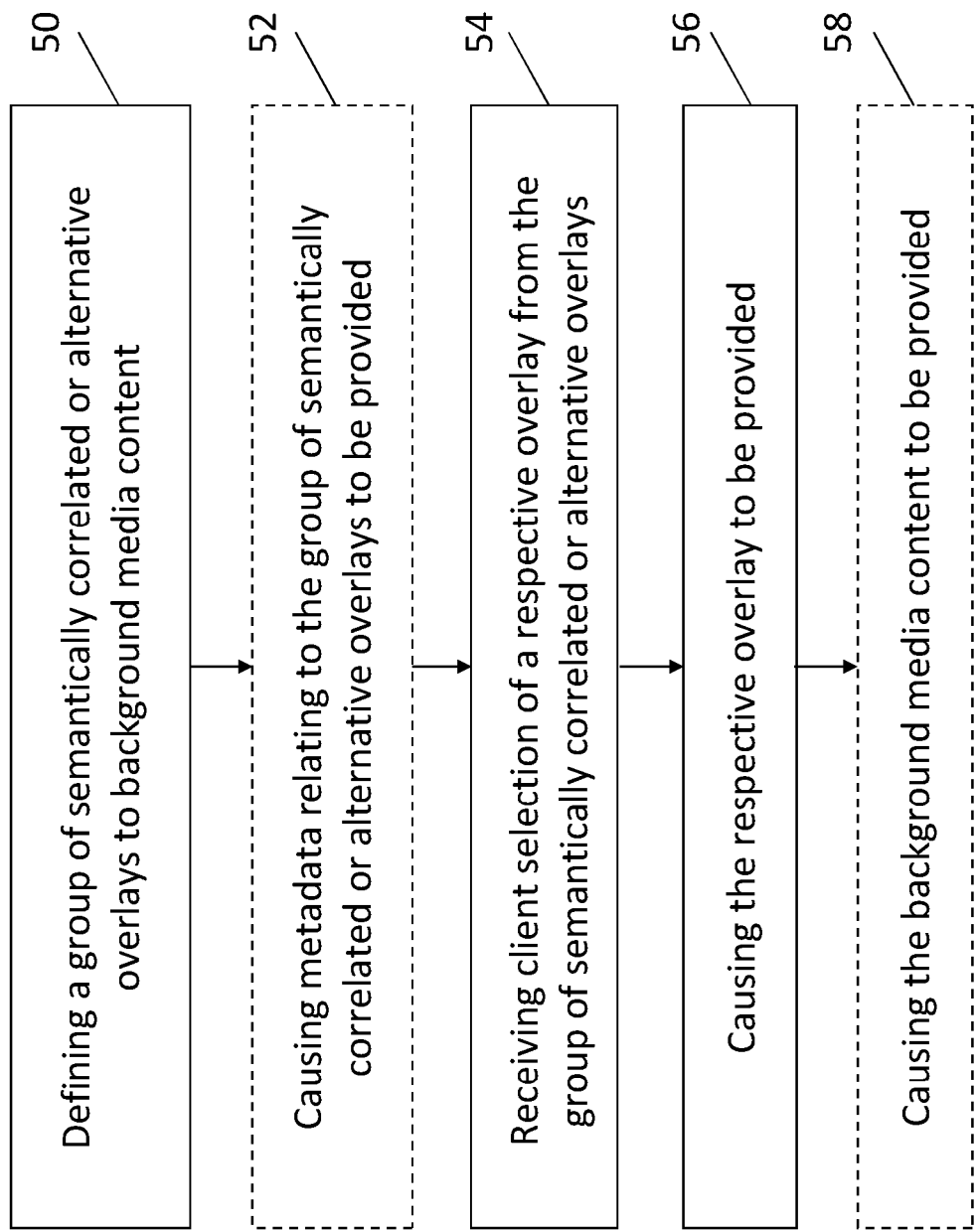
Figure 6:
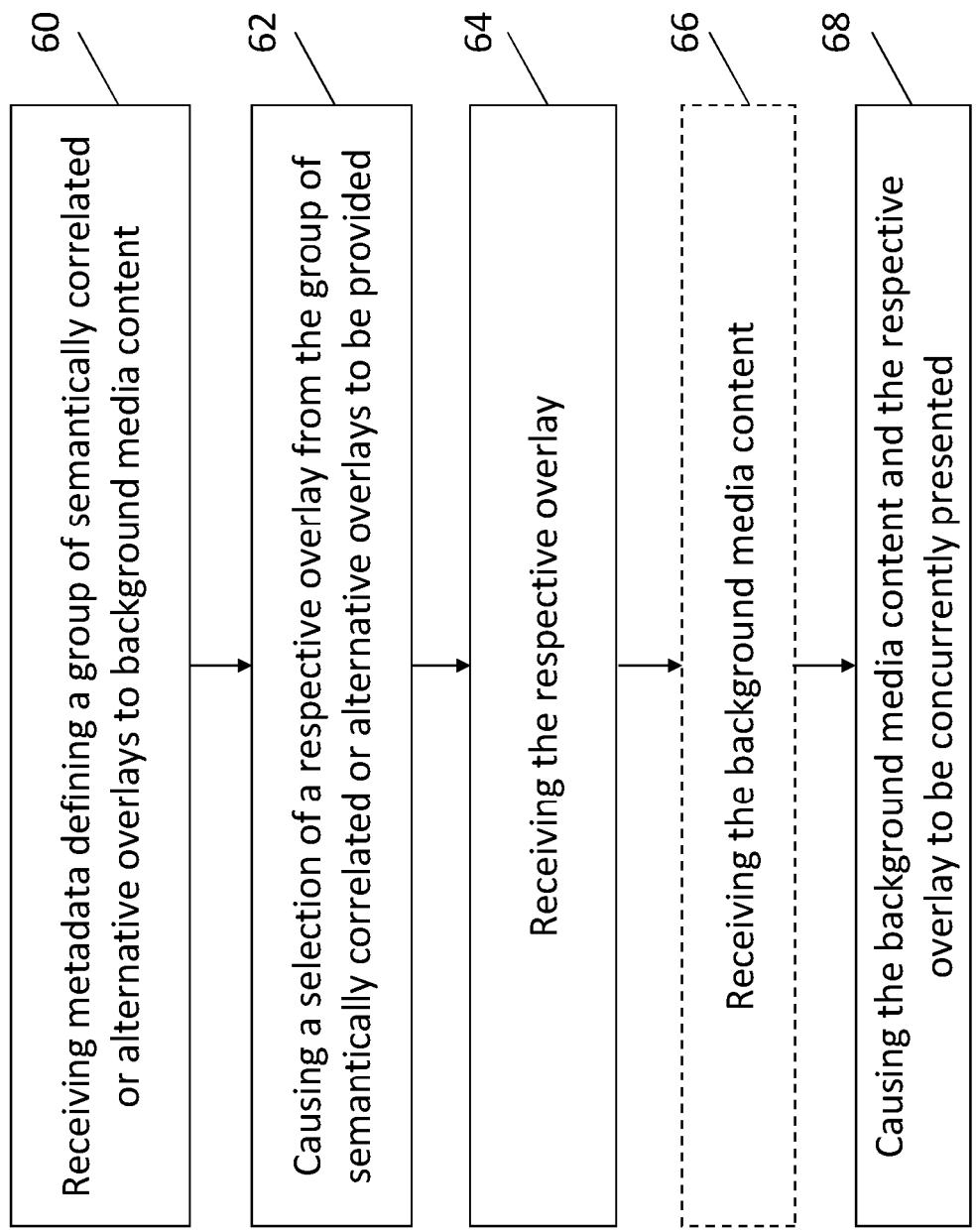

Having thus described certain example embodiments of the present disclosure in general terms, reference will hereinafter be made to the accompanying drawings, which are not necessarily drawn to scale, and wherein:

FIGS. 1A and 1B are graphical representations of terms referenced in connection with describing some of the example embodiments contained herein;

FIG. 1C illustrates background media content and four semantically correlated overlays and three alternative commentary channels to the background media content;

FIG. 2 is a block diagram of an apparatus that may be specifically configured in accordance with an example embodiment of the present invention;

FIG. 3 is a flowchart illustrating a set of operations performed, such as by the apparatus of FIG. 2, in accordance with an example embodiment of the present invention;

FIG. 4 is a flowchart illustrating a set of operations performed, such as by the apparatus of FIG. 2, in accordance with an example embodiment of the present invention;

FIG. 5 is a flowchart illustrating operations performed, such as by the apparatus of FIG. 2, in relation to the provision of metadata relating to a group of semantically correlated or alternative overlays to background media content in accordance with an example embodiment of the present disclosure; and FIG. 6 is flowchart illustrating operations performed, such as by the apparatus of FIG. 2, in relation to the selection of a respective overlay from a group of semantically correlated or alternative overlays to background media content in accordance with an example embodiment of the present disclosure.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

As defined herein, a "visual overlay" refers to a layer of video or image and/or image sequence configured to be rendered as part of a multi-layer omnidirectional visual content. A visual overlay may be overlaid on top of another omnidirectional video sequence or image (from the perspective of a viewer) and/or overlaid by another visual overlay. A visual overlay may be partially or fully overlapping with the another omnidirectional video sequence or image and/or other visual overlays.

A method, apparatus and computer program product are provided in accordance with an example embodiment in order to provide and utilize an overlay metadata file defining the user interaction capabilities for different parts of multi-layer omnidirectional visual content, such as the 3DoF/3DoF+/6DoF content, and the behavior when the multi-layer omnidirectional visual content is consumed as an overlay.

Immersive multimedia such as omnidirectional content consumption is more complex for the end user compared to the consumption of two dimensional (2D) content. This is due to the higher degree of freedom available to the end user. This freedom also results in more uncertainty, since the immersive content to be viewed at any point of time may differ (in terms of field of view) from typical 2D content, which has a more certain nature because of its inherent limited field of view. The situation is further complicated when layers of content are rendered, e.g., in case of overlays. In case of multiple 3DoF/3DoF+/6DoF content (captured in the same or different times and locations), if there are overlays comprising 2D/3DoF/3DoF+/6DoF content, it is important to enunciate user interaction with an overlay and indicate the manner as well as the target of the interaction. Furthermore, it can have an adverse impact on the user experience, if the user interactions (for example, head motion, head rotation or translation) are applied to the foreground and the background content at the discretion of client implementation. Relying solely on client implementation may distort the content creator or publisher's creative intent on the content, resulting in non-optimal user experience. Background media is a piece of visual media on which an overlay is superimposed. An overlay is a piece of visual media rendered over omnidirectional video or an image item or over a viewport.

The method, apparatus and computer program product may be utilized in conjunction with a variety of different visual and/or audiovisual content files including visual and/or audiovisual content files formatted in accordance with a number of different formats including various video, audio-visual and image file formats.

Available media file format standards include International Standards Organization (ISO) base media file format (ISO/IEC 14496-12, which may be abbreviated ISOBMFF), Moving Picture Experts Group (MPEG)-4 file format (ISO/IEC 14496-14, also known as the MP4 format), file format for NAL (Network Abstraction Layer) unit structured video (ISO/IEC 14496-15) and High Efficiency Video Coding standard (HEVC or H.265/HEVC).

Some concepts, structures, and specifications of ISOBMFF are described below as an example of a container file format, based on which some embodiments may be implemented. The aspects of the disclosure are not limited to ISOBMFF, but rather the description is given for one possible basis on top of which at least some embodiments may be partly or fully realized.

A basic building block in the ISO base media file format is called a box. Each box has a header and a payload. The box header indicates the type of the box and the size of the box in terms of bytes. Box type is typically identified by an unsigned 32-bit integer, interpreted as a four character code (4CC). A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit.

A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

The 'trak' box includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derived from generic classes (e.g. VisualSampleEntry, AudioSampleEntry). Which type of sample entry form is used for derivation of the track-type specific sample entry format is determined by the media handler of the track.

The track reference mechanism can be used to associate tracks with each other. The TrackReferenceBox includes box(es), each of which provides a reference from the containing track to a set of other tracks. These references are labeled through the box type (e.g., the four-character code of the box) of the contained box(es).

The ISO Base Media File Format contains three mechanisms for timed metadata that can be associated with particular samples: sample groups, timed metadata tracks, and sample auxiliary information. A derived specification may provide similar functionality with one or more of these three mechanisms.

A sample grouping in the ISO base media file format and its derivatives, such as the advanced video coding (AVC) file format and the scalable video coding (SVC) file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. A SampleToGroupBox may comprise a grouping_type_parameter field that can be used e.g. to indicate a sub-type of the grouping.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each one of them can be associated with a file name and are uniquely identified with the file by item identifier (item_id) which is an integer value. The metadata items may be for example stored in the 'idat' box of the meta box or in an 'mdat' box or reside in a separate file. If the metadata is located external to the file then its location may be declared by the DataInformationBox (four-character code: 'dinf'). In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents.

The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more ItemPropertyAssociationBox(es) that associate items with item properties.

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises still images that are stored as items and image sequences that are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

Any number of image items can be included in the same file. Given a collection of images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using an item reference of type 'thmb' or 'auxl', respectively.

As used herein the term omnidirectional may refer to media content that has greater spatial extent than a field-of-view of a device rendering the content. Omnidirectional content may for example cover substantially 360 degrees in the horizontal dimension and substantially 180 degrees in the vertical dimension, but omnidirectional may also refer to content covering less than 360 degree view in the horizontal direction and/or 180 degree view in the vertical direction.

A panoramic image covering a 360-degree field-of-view horizontally and a 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. In some cases panoramic content with a 360-degree horizontal field-of-view but with less than a 180-degree vertical field-of-view may be considered special cases of equirectangular projection, where the polar areas of the sphere have not been mapped onto the two-dimensional image plane. In some cases panoramic content may have less than a 360-degree horizontal field-of-view and up to a 180-degree vertical field-of-view, while otherwise having the characteristics of an equirectangular projection format.

In cube map projection format, spherical video is projected onto the six faces (a.k.a. sides) of a cube. The cube map may be generated e.g. by first rendering the spherical scene six times from a viewpoint, with the views defined by a 90 degree view frustum representing each cube face. The cube sides may be frame-packed into the same frame or each cube side may be treated individually (e.g., in encoding). There are many possible orders of locating cube sides onto a frame and/or cube sides may be rotated or mirrored. The frame width and height for frame-packing may be selected to fit the cube sides "tightly" e.g. at a 3×2 cube side grid, or may include unused constituent frames e.g. at a 4×3 cube side grid.

In general, 360-degree content can be mapped onto different types of solid geometrical structures, such as a polyhedron (that is, a three-dimensional solid object containing flat polygonal faces, straight edges and sharp corners or vertices, e.g., a cube or a pyramid), a cylinder (by projecting a spherical image onto the cylinder, as described above with the equirectangular projection), a cylinder (directly without projecting onto a sphere first), a cone, etc. and then unwrapped to a two-dimensional image plane. The two-dimensional image plane can also be regarded as a geometrical structure. In other words, 360-degree content can be mapped onto a first geometrical structure and further unfolded to a second geometrical structure. However, it may be possible to directly obtain the transformation to the second geometrical structure from the original 360-degree content or from other wide view visual content. In general, an omnidirectional projection format may be defined as a format to represent (up to) 360-degree content on a two-dimensional image plane. Examples of omnidirectional projection formats include the equirectangular projection format and the cubemap projection format.

A viewport may be defined as a region of omnidirectional image or video suitable for display and viewing by the user. A current viewport (which may be sometimes referred simply as a viewport) may be defined as the part of the spherical video that is currently displayed and hence is viewable by the user(s). At any point of time, a video rendered by an application on a head-mounted display (HMD) renders a portion of the 360-degree video, which is referred to as a viewport. Likewise, when viewing a spatial part of the 360-degree content on a conventional display, the spatial part that is currently displayed is a viewport. A viewport is a window on the 360-degree world represented in the omnidirectional video displayed via a rendering display. A viewport may be characterized by a horizontal field-of-view (VHFoV) and a vertical field-of-view (VVFoV). In the following, the horizontal field-of-view of the viewport will be abbreviated with HFoV and, respectively, the vertical field-of-view of the viewport will be abbreviated with VFoV.

A sphere region may be defined as a region on a sphere that may be specified by four great circles or by two azimuth circles and two elevation circles and additionally by a tile angle indicating rotation along the axis originating from the sphere origin passing through the center point of the sphere region. A great circle may be defined as an intersection of the sphere and a plane that passes through the center point of the sphere. A great circle is also known as an orthodrome or Riemannian circle. An azimuth circle may be defined as a circle on the sphere connecting all points with the same azimuth value. An elevation circle may be defined as a circle on the sphere connecting all points with the same elevation value.

The Omnidirectional Media Format ("OMAF") standard (ISO/IEC 23090-2) specifies a generic timed metadata syntax for sphere regions. A purpose for the timed metadata track is indicated by the track sample entry type. The sample format of all metadata tracks for sphere regions specified starts with a common part and may be followed by an extension part that is specific to the sample entry of the metadata track. Each sample specifies a sphere region.

One of the specific sphere region timed metadata tracks specified in OMAF is known as a recommended viewport timed metadata track, which indicates the viewport that should be displayed when the user does not have control of the viewing orientation or has released control of the viewing orientation. The recommended viewport timed metadata track may be used for indicating a recommended viewport based on a "director's cut" or based on measurements of viewing statistics. A textual description of the recommended viewport may be provided in the sample entry. The type of the recommended viewport may be indicated in the sample entry and may be among the following:

A recommended viewport per the director's cut, e.g., a viewport suggested according to the creative intent of the content author or content provider.

A recommended viewport selected based on measurements of viewing statistics.

Unspecified (for use by applications or specifications other than OMAF).

Videos and/or images may be overlaid on an omnidirectional video and/or image. The coded overlaying video can be a separate stream or part of the bitstream of the currently rendered 360-degree video/image. An omnidirectional streaming system may overlay a video/image on top of the omnidirectional video/image being rendered. The overlaid two-dimensional video/image may have a rectangular grid or a non-rectangular grid. The overlaying process may cover the overlaid video/image or a part of the video/image or there may be some level of transparency/opacity or more than one level of transparency/opacity wherein the overlaid video/image may be seen under the overlaying video/image but with less brightness. In other words, there could be an associated level of transparency corresponding to the video/image in a foreground overlay and the video/image in the background (video/image of a VR scene). The terms opacity and transparency may be used interchangeably.

The overlaid region may have one or more than one levels of transparency. For example, the overlaid region may have different parts with different levels of transparency. In accordance with an embodiment, the transparency level could be defined to be within a certain range, such as from 0 to 1 so that the smaller the value the smaller is the transparency, or vice versa.

Additionally, the content provider may choose to overlay a part of the same omnidirectional video over the current viewport of the user. The content provider may want to overlay the video based on the viewing condition of the user. For example, overlaying may be performed, if the user's viewport does not match the content provider's recommended viewport. In this case, the client player logic overlays the content provider's recommended viewport (as a preview window) on top of the current viewport of the user. It may also be possible to overlay the recommended viewport, if the user's current viewport does not match, such that the position of the overlaid video is based on the direction in which the user is viewing. For example, the recommended viewport may be overlaid to the left of the display, if the recommended viewport is to the left of the user's current viewport. It may also be possible to overlay the whole 360-degree video. Yet another example is to use the overlaying visual information as a guidance mechanism to guide the user towards the recommended viewport, for example guiding people who are hearing impaired.

There may be one or more conditions regarding when and how to display the visual overlay. Therefore, a rendering device may need to receive information which the rendering device may use to perform the overlaying as indicated by the signaled information.

An approach for authoring one or more conditions regarding when and how to display the visual overlay is described next. A content author obtains the omnidirectional content (e.g., background) and the overlaying content (e.g., the foreground overlay) and provides them to an encapsulating device, which may be, for example, a part of an encoder or another apparatus, such as the processing circuitry. The omnidirectional content may be encapsulated and stored in, for example, a container file, and may be described in a manifest. The content author generates a first indication and inserts the first indication in a bitstream, in a container file, and/or in a manifest. The first indication indicates the omnidirectional video sequence or image to be delivered to a content rendering device. The content author may also generate a second indicator indicating the visual overlay configured to be rendered as a multi-layer visual content with an omnidirectional video sequence or image. The second indicator may also be inserted in a bitstream, a container file, and/or a manifest. Furthermore, the content author may determine overlaying conditions such as how, where and when the omnidirectional video sequence or image or part of it is intended to be overlaid by the overlaying content. The overlaying conditions may include a first condition in which case the visual overlay is to be overlaid or a second condition in which case the visual overlay is not to be overlaid. Then, the content author may also generate a third indication indicating the first condition or the second condition. The third indication may also be inserted in a bitstream, a container file, and/or a manifest.

The omnidirectional content, the overlaying content and the indicators may be stored into one or more files and/or delivered to a receiving apparatus, for example when a request for content delivery is received from the receiving apparatus.

In an approach, the receiving apparatus may perform the following operations to render the received contents. The receiving apparatus may receive a bitstream, a container file, and/or a manifest, and parse, from the bitstream, a container file, and/or a manifest, the first indication of the omnidirectional video sequence or image. The receiving apparatus may also parse, from the bitstream, the container file, and/or the manifest, the second indication of a visual overlay, intended to be overlaid, under certain conditions, on the omnidirectional video sequence or image for displaying. Furthermore, the receiving apparatus may parse, from the bitstream, the container file, and/or the manifest, the first condition in which case the visual overlay is to be overlaid or the second condition in which case the visual overlay is not to be overlaid. The receiving apparatus may decode the omnidirectional video sequence or image. The receiving apparatus may then render the decoded omnidirectional video sequence or image and show it on a display of the receiving apparatus or deliver the omnidirectional video sequence or image to another apparatus capable for displaying the omnidirectional video sequence or image. The receiving apparatus may also examine whether the first condition or the second condition was received. If the first condition was received, the receiving apparatus may examine whether the first condition is fulfilled or not. The receiving apparatus may decode the overlaying content. If the examination reveals that the first condition is fulfilled, the receiving apparatus may render the decoded overlaying content on the display or deliver the overlaying content to the other apparatus which may display the overlaying content. If, however, the second condition was received, the receiving apparatus may examine whether the second condition is fulfilled or not. If the examination reveals that the second condition is fulfilled, the overlaying content will not be shown. On the other hand, if the examination reveals that the second condition is not fulfilled, the receiving apparatus may render the overlaying content on the display or deliver the overlaying content to the other apparatus which may display the overlaying content.

Although it was described above that the receiving apparatus performs the examining of the first/second condition, it may be possible that the receiving apparatus sends information of the first/second condition and the overlaying content to the optional other apparatus, which may then perform the examination of the first/second condition and determine whether to show the overlaying content or not.

In an example, a syntax structure (OverlayStruct) containing one or more conditions on when and how to display a visual overlay may be specified as follows:

```
aligned(8) class SingleOverlayStruct( ) {
    for (i = 0; i < num_flag_bytes * 8; i++)
        unsigned int(1) overlay_control_flag[i];
    for (i = 0; i < num_flag_bytes * 8; i++){
        if (overlay_control_flag[i]) {
            unsigned int(1) overlay_control_essential_flag[i];
            unsigned int(15) byte_count[i];
            unsigned int(8) overlay_control_struct[i][byte_count[i]];
        }
    }
}
aligned(8) class OverlayStruct( ) {
    unsigned int(16) num_overlays;
    unsigned int(8) num_flag_bytes;
    for (i = 0; i < num_overlays; i++)
        SingleOverlayStruct( );
}
``` num_overlays specifies the number of overlays described by this structure. num_overlays equal to 0 is reserved. num_flag_bytes specifies the number of bytes allocated collectively by the overlay_control_flag[i] syntax elements. num_flag_bytes equal to 0 is reserved. overlay_control_flag[i] when set to 1 defines that the structure as defined by the i-th overlay_control_struct[i] is present. overlay_control_essential_flag[i] equal to 0 specifies that players are not required to process the structure as defined by the i-th overlay_control_struct[i]. overlay_control_essential_flag[i] equal to 1 specifies that players are required to process the structure as defined by the i-th overlay_control_struct[i]. When overlay_control_essential_flag[i] is equal to 1 and a player is not capable of parsing or processing the structure as defined by the i-th overlay_control_struct[i], the player ought to display neither the overlays specified by this structure nor the background visual media. byte_count[i] gives the byte count of the structure represented by the i-th overlay_control_struct[i]. overlay_control_struct[i][byte_count[i]] defines the i-th structure with a byte count as defined by byte_count[i].

OverlayStruct may be used e.g. as in the following containing structures:

- A box included in sample entry of a track containing a visual overlay. The information of the OverlayStruct applies to the samples that reference the sample entry containing the box.
- An overlay item property. The information of the OverlayStruct applies to the overlays contained in the associated image item.
- A sample in a timed metadata track. The information of the OverlayStruct of a timed metadata sample applies to the time-aligned sample(s) in the referenced media track(s), as indicated through track reference(s).

Examples of conditions or features that may be indicated for overlays e.g. in the OverlayStruct may include but are not limited to one or more of the following:

- Viewport-relative overlays (indicating the position and size of an overlay relative to the viewport)
- Sphere position, orientation, and/or sphere region for sphere-relative overlays
- Depth of overlays, e.g. relative to the unit sphere
- Opacity of overlays, or transparency of overlays
- Indicating that an identified recommended viewport track is used as an overlay An example of a particular condition to be indicated in the OverlayStruct is provided next: OverlayOpacity is defined when overlay_control_struct[X] is enabled, where X is a specific unsigned integer. OverlayOpacity defines the opacity that is to be applied on the overlay for rendering on the background visual media. The terms opacity and transparency may be used interchangeably. The following syntax may be used for the bytes carried in overlay_control_struct[i][byte_count[i]]:

```
aligned(8) class OverlayOpacity( ) {
    unsigned int(8) opacity;
}
``` in which opacity is an integer value that specifies the opacity that is to be applied for the overlay. In an example embodiment, value 0 is fully transparent and value 100 is fully opaque with intermediate values defining corresponding relative values of partial transparency. Values greater than 100 are reserved.

One of more overlays may be carried in a single visual media track or a single image item. When more than one overlay is carried in a single track or image item, or when an overlay is carried with other media (e.g. background), a mapping of regions from the samples of the track or the image item to the overlay metadata may be provided, e.g. in or associated with the OverlayStruct.

When several tracks or image items are collectively carrying one or more overlays and/or the background visual media, a group of the tracks and image items may be indicated in a container file. For example, an entity group of ISOBMFF may be used for this purpose.

A content author may want to allow or disallow user interactions applying to the one or more overlays. However, there is a lack of a mechanism to indicate signaling the allowed and/or disallowed types of user interaction on overlays and/or the extents and other parameters indicating the range of effects that user interaction is allowed to have.

FIGS. 1A and 1B are graphical representations of terms referenced in connection with describing some of the example embodiments contained herein. FIG. 1A shows the user interactions including movement in a lateral direction, head rotations and translations (forward or backward). In FIG. 1B, a user views omnidirectional content with a foreground overlay and background. The foreground overlay and background could be any omnidirectional content including 2D/3DoF/3DoF+ content provided in various different formats, such as the HEVC.

Regardless of the file format of the visual and audiovisual content, the apparatus of an example embodiment may be provided by any of a wide variety of computing devices including, for example, a video encoder, a video decoder, a computer workstation, a server or the like, or by any of various mobile computing devices, such as a mobile terminal, e.g., a smartphone, a tablet computer, a video game player, etc. Alternatively, the apparatus may be embodied by a virtual reality system, such as a virtual reality headset capable of receiving one or more data streams and rendering visual and audiovisual content that can be presented to a user.

One or more overlays may be associated with immersive multimedia, such as omnidirectional content. As shown in FIG. 1C, for example, background media content, such as omnidirectional content, may be provided. In the illustrated example, the background media content depicts a football game. One or more overlays may be provided to the background media content in order to enrich the user experience. In some instances, a plurality of alternative overlays to the same background media content are provided. These overlays may be semantically correlated in that the alternative overlays all relate to the same background media content and convey the same general content, but represent content with different levels of detail. In relation to the example of FIG. 1C, Overlay 1 is a large field of view video, such as the video of a commentary panel discussing the football game. Overlay 2 is a small field of view video, such as the video of one of the commentators discussing the football game. Overlay 3 is a representative image, such as the image of one of the commentators who is discussing the football game. Finally, Overlay 4 it is the text version of the commentary provided by the panel. Overlays 1, 2, 3 and 4 of this example embodiment are alternative overlays that represent the same content, albeit at different levels of detail. As such, only one of the alternative overlays is generally presented along with the background media content at any instance in time. As another scenario, the plurality of alternative overlays represent different choices of the content. For example, different commentary channels can be provided to the user to choose from.

However, a mechanism is not provided for signaling and storing the relationship between the different tracks or image items corresponding to the alternative overlays. Indeed, the current mechanism for rate adaptation is to reduce the overlay quality of a single overlay media stream, such as a dynamic adaptive streaming over hypertext transport protocol (HTTP) (DASH) representation set, or to drop the overlay. Thus, a client cannot reduce the bit rate consumed by the client or reduce the decoding requirements by replacing a more complex overlay, such as a video overlay, with a simpler overlay, such as a small field of view video overlay, a representative image overlay or a textural overlay. Furthermore, for certain scenarios, the different alternatives are not only different representations of the same content. These can also be different contents, such as different commentary channels or episodes of a longer video.

A method, apparatus and computer program product are provided in accordance with an example embodiment, however, in order to group overlays. As such, a client can select a desired overlay from among the group of overlays and the desired overlay may then be downloaded along with the background media content for presentation by the client. The resulting presentation is therefore tailored to the client and may be based upon various factors including the bandwidth required for downloading of the selected overlay, the resolution of the selected overlay, the fidelity of the respective overlay or the like. Thus, in instances in which the client is less interested in the information provided by the overlay, a less complex overlay, such as a textual overlay or a representative image overlay, may be selected and downloaded for presentation concurrent with the background media content, thereby conserving network resources associated with the transmission of the overlay and processing resources associated with the decoding and presentation of the overlay. However, in instances in which the information provided by the overlay is of more interest, the client may select a more complex overlay, such as a more detailed video overlay, that provides enhanced information and improves the user experience, albeit at the cost of the consumption of additional network and processing resources.

In an example embodiment, the background media content and the overlays are provided by a source computing device, such as an origin server, an edge server, a cache server or the like. In this example embodiment, the background media content and the selected overlay are received and presented by a client computing device. The client computing device may be embodied by any of a variety of computing devices including fixed computing devices, such as a personal computer, a computer workstation, a television or the like, a mobile computing device, such as a mobile telephone, a tablet computer, a laptop computer or the like, or any of a variety of audio and visual systems.

Various computing devices may include or otherwise be associated with an apparatus 20, and the apparatus 20 of an example embodiment includes, is associated with or is otherwise in communication with processing circuitry 22, a memory 24, a communication interface 26 and optionally, a user interface 28 as shown in FIG. 2.

The processing circuitry 22 may be in communication with the memory device 24 via a bus for passing information among components of the apparatus 20. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 20 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 22 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 26 may be any means such as a device or circuitry embodied in either hardware or a combination of hardware and software that is configured to receive and/or transmit data, including visual content in the form of video or image files, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 20 is configured to process the visual content in the form of video or image files and render the visual content in the form of video or image files, the apparatus 20 may optionally include a user interface 28 that may, in turn, be in communication with the processing circuitry 22 to provide output to the user, such as by rendering the visual content in the form of video or image files and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 24, and/or the like).

Several embodiments relate to indicating e.g. a set of indications (below also referred to as a file) defining, for example, allowed and/or disallowed interactions in a bitstream, a container file, and/or a manifest or parsing information from a bitstream, a container file, and/or a manifest. An example of a set of indications is a user interaction definition file that may define a first set of interaction types that are allowed to be performed by the user. The bitstream may, for example, be a video or image bitstream (such as an HEVC bitstream), wherein the indication may utilize, for example, supplemental enhancement information (SEI) messages. The container file may, for example, comply with the ISO base media file format, the Matroska file format, or the Material eXchange Format (MXF). The manifest may, for example, conform to the Media Presentation Description (MPD) of MPEG-DASH (ISO/IEC 23009-1), the M3U format, or the Composition Playlist (CPL) of the Interoperable Master Format (IMF) or the Video Master Format defined by VR-IF. It needs to be understood that these formats are provided as examples and that embodiments are not limited to these formats. Certain embodiments may be similarly realized with any other similar container or media description formats, such as the Session Description Protocol (SDP). An example embodiment may be realized with a suite of bitstream format(s), container file format(s) and manifest format(s) that include the indications. MPEG OMAF is an example of such a suite of formats.

It needs to be understood that instead of or in addition to a manifest, an example embodiment similarly applies to a container file format and/or a media bitstream. For example, instead of or in addition to indicating a spatial region to be overlaid and a spatial region for overlaying in a manifest, they can be indicated within metadata of a container file format that also contains or refers to the encoded bitstream.

Referring now to FIG. 3, the operations performed, such as by the apparatus 20 of FIG. 2, in order to create an overlay metadata file including a user interaction definition file associated with a visual overlay in accordance with an example embodiment are depicted. As shown in block 30, the apparatus includes means, such as the processing circuitry 22, the communication interface 26 or the like, for receiving a visual overlay configured to be rendered as a multi-layer visual content with an omnidirectional video sequence or image. The visual overlay may be a visual overlay defined in OMAF. The omnidirectional video sequence or image may be one or more other foreground visual overlays and/or a background, that is, a furthermost visual overlay.

A "visual overlay" is a layer of video or image and/or image sequence configured to be rendered as part of a multi-layer omnidirectional visual content. A visual overlay may be overlaid on top of another omnidirectional video sequence or image and/or overlaid by another visual overlay. A visual overlay may be partially or fully overlapping with the another omnidirectional video sequence or image and/or other visual overlays.

Upon receiving the visual overlay, as illustrated in block 32, the apparatus 20 includes means, such as the processing circuitry 22, for constructing an overlay metadata file associated with the visual overlay, wherein the overlay metadata file comprises a user interaction definition file. In some embodiments, the overlay metadata file is a SingleOverlayStruct metadata file specified in OMAF.

The user interaction definition file may define a first set of interaction types that are allowed to be performed by the user and may be included in or along the coded foreground overlay or the background content (e.g. as metadata in the container file encapsulating the coded foreground overlay and/or the background content). Alternatively or additionally, a second set of interaction types that are disallowed to be performed by the user may be included in or along the coded foreground overlay or the background content. The types of interactions that may be included in the first set and/or in the second set may include but are not limited to one or more of the following:
  i. moving or swiping the overlay to a different viewport
  ii. moving or swiping the overlay to a different viewpoint; when included in the first set, this interaction type would e.g. allow the user to keep the same viewport-locked overlay visible when switching from one viewpoint to another
  iii. moving or pushing or pulling the overlay to a different depth
  iv. rotating the overlay, e.g. along horizontal and vertical axes. The coordinate axes for the rotation and their orientation relative to reference coordinate axes may be additionally signaled. For a viewport-locked overlay, the coordinate axes may be pre-defined to be the X and Y axes of the viewport.
v. resizing the overlay
vi. magnifying the overlay
vii. change the transparency or opacity of the overlay
viii. switching ON/OFF the overlay
ix. scrolling the scene within the overlay window
x. volume of the audio that is associated with the overlay
xi. slicing the overlay (e.g., horizontally or vertically or in some other predefined direction)
xii. cropping the overlay so as to only make a portion of the overlay visible to the viewer In some embodiments, the user interaction definition file may have the following data structure:

```
aligned(8) class OverlayInteraction ( ) {
    unsigned int(1) change_position_flag;
    unsigned int(1) change_viewport_flag;
    unsigned int(1) change_depth_flag;
    unsigned int(1) switch_on_off_flag;
    unsigned int(1) change_opacity_flag;
    unsigned int(1) resize_flag;
    unsigned int(1) resize_change_FOV_flag;
    unsigned int(1) rotation_flag;
    unsigned int(1) change_audio_flag;
    unsigned int(1) scroll_flag;
    bit(6) reserved;
    if(rotation_flag){
        OverlayRotation( );
    }
    OverlayParallax( ) {
     unsigned int(16) maxX;
     unsigned int(16) maxY;
     unsigned int(16) maxZ;
    }
    if(resize_flag) {
        unsigned int(16) max_width_percent;
        unsigned int(16) max_height_percent;
    }
    if(resize_change_FOV_flag) {
        unsigned int(16) max_width_percent;
        unsigned int(16) max_height_percent;
        unsigned int(16) max_FOV_Hor;
        unsigned int(16) max_FOV_Ver;
    }
}
```

The corresponding semantics of the syntax elements are defined in an example embodiment set forth below:

change_position_flag, when set to 1 then the overlay window can be moved to any location on the viewing sphere or the viewport without changing the depth of the overlay. In one embodiment, the depth of the overlay could be determined by the depth value of the center of the overlay change_viewport_flag, when set to 1 then the viewport of overlay can be chosen by user interaction. (User can change the viewport but not the depth of the overlay)

change_depth_flag, when set to 1 then the depth of overlay can be chosen by user interaction. (user can change the depth and not the viewport)

When both change_viewport_flag and change_depth_flag are set to 1 or when change_position_flag and change_depth_flag are set to 1, then the position of the overlay can be freely choosen by user interaction.

switch_on_off_flag, when set to 1 then the user can switch ON/OFF the overlay.

change_opacity_flag, when set to 1 then the user can change the transparency or opacity of the overlay.

resize_flag, when set to 1 then the user can resize the overlay window. The field-of-view of the resized overlay window may be same as that of the original overlay window.

max_width_percent and max_height_percent specify the maximum width and height, respectively, of the overlay in percents relative to the original width and height of the overlay, respectively. The values of one embodiment are indicated in units of $2^{-16}$ percent. If defined the user cannot resize the overlay beyond the maximum values. In another embodiment, the minimum resize values could also be defined in a similar way with flags such as min_width_percent and min_height_percent which may specify the minimum allowed width and height of the overlay in percents relative to the original width and height of the overlay. These values could also have the same units as defined above for maximum width and height percent values.

resize_change_FOV_flag, when set to 1 then the user can resize the overlay window. The field-of-view of the resized overlay window may not be same as that of original overlay window.

max_FOV_Hor and max_FOV_Ver specify the maximum FOV in horizontal and vertical directions, respectively, that the user can resize the overlay window. If defined the user cannot resize the overlay beyond the maximum values.

rotation_flag, when set to 1 then the user can rotate the overlay window, the amount of rotation that can be performed on the overlay is limited by the overlayRotation structure. If the rotation_flag is set to 1 and there is no overlayRotation structure defined then the user can rotate the overlay freely in any direction. The rotation interaction may be such that, after rotation of the overlay by the user, the content of the overlay may not be occluded to the user viewing the overlay.

change_audio_flag, when set to 1 then the user can change the audio of the overlay visual media independent of the background visual media.

scroll_flag, when set to 1 then the user can scroll through the content displayed in the overlay window.

The OverlayInteraction syntax structure may be, for example, included as a single structure within the SingleOverlayStruct which is an overlay metadata file associated with a visual overlay as described above and a particular index value i indicates the presence of OverlayInteraction syntax structure within the SingleOverlayStruct.

In an embodiment related to SingleOverlayStruct as described above, a separate index value i is assigned for each interaction type and a overlay_control_flag[i] is provided to define whether to allow/disallow the interaction. When the overlay_control_flag[i] within the SingleOverlayStruct is equal to 1, the respective interaction type is allowed to be controlled by the user. When overlay_control_flag[i] within the SingleOverlayStruct is equal to 0, the respective interaction type is disallowed to be controlled by the user. The additional parameters for the i-th interaction type, when allowed to be controlled by the user, may be provided within the overlay_control_struct[i][byte_count[i]].

The OverlayRotation struct defines the rotation that can be performed by the user on the overlay.

```
aligned(8) class OverlayRotation( ) {
    unsigned int(16) max_yaw;
    unsigned int(16) max_pitch;
    unsigned int(16) max_roll;
}
``` max_yaw, max_pitch and max_roll defines the absolute values of yaw, pitch and roll angles, respectively that a user can rotate the overlay window. The amount of rotation is from 0 up to the maximum values defined in the corresponding direction.

The OverlayParallax data structure defines the accessible viewing space for an overlay, that is, the extent to which head motion parallax will be responded to. maxX, maxY, and maxZ respectively define the accessible viewing extent on an X-axis, Y-axis and a Z-axis. In some embodiments, the accessible viewing space is smaller than an overlay 3DOF+ viewing space.

The rotation interaction may be such that, after rotation of the overlay by the user, the content of the overlay may not be occluded to the user viewing the overlay.

Upon constructing the overlay metadata file associated with the visual overlay, as illustrated in block 34, the apparatus 20 includes means, such as the processing circuitry 22, for causing storage of the visual overlay and the overlay metadata file. Thereafter, the visual overlay and the overlay metadata file may be transmitted or other actions may be taken. For example, the visual overlay and the overlay metadata file may be provided with an omnidirectional video sequence or image to an omnidirectional content player.

In some embodiments, the omnidirectional content player playing back the omnidirectional content with overlay provides means for interaction to the user such that the user can do one or more of the following:
 move or swipe the overlay to a different viewport
 move or swipe the overlay to a different viewpoint or freeze the overlay onto the viewport regardless of viewpoint changes
 move or push or pull the overlay to a different depth
 move the overlay flexibly to any position
 rotate the overlay along yaw, pitch and roll directions
 resize the overlay window
 change the field-of-view of the overlay
 change the transparency or opacity of the overlay
 switch ON/OFF the overlay
 magnify the overlay
 scroll the scene within the overlay window
 control the volume of audio associated with the overlay, e.g., by increasing the volume when the overlay is being watched
 slice the overlay (e.g., horizontally or vertically or other predefined direction)
 crop the overlay (that is, to only make a portion of the overlay visible to the viewer)

As such, the operations associated with playing back the omnidirectional video sequence or image along with the visual overlay and the overlay metadata file, among other files, are depicted in conjunction with FIG. 4. Although reference with respect to the apparatus configured to perform the operations of FIG. 4 is made below relative to the apparatus 20 of FIG. 2, the apparatus for performing the operations of FIG. 4 may be the same apparatus or a different apparatus, that is, embodied by a different computing device than that which created the overlay metadata file. However, the apparatus configured to perform of the operations of FIG. 5 may include the user interface 28 as referenced below.

As illustrated in block 40, the apparatus 20 includes means, such as the processing circuitry 22, the communications interface 26 or the like, for receiving an omnidirectional video sequence or image. In some embodiments, the omnidirectional video sequence or image may be a file formatted in accordance with OMAF.

As illustrated in block 42, the apparatus 20 includes means, such as the processing circuitry 22, the communications interface 26 or the like, for receiving a visual overlay configured to be rendered as a multi-layer visual content with an omnidirectional video sequence or image and an overlay metadata file associated with the visual overlay. The omnidirectional video sequence of image may comprise one or more other visual overlays and/or background, e.g., a furthermost visual overlay. The overlay metadata file comprises a user interaction definition file. The overlay metadata file and the user interaction definition file may be the overlay metadata file and the user interaction definition file described in conjunction with FIG. 3. A "visual overlay" is a layer of video or image and/or image sequence configured to be rendered as part of a multi-layer omnidirectional visual content. A visual overlay may be overlaid on top of another omnidirectional video sequence or image and/or overlaid by another visual overlay. A visual overlay may be partially or fully overlapping with the other another omnidirectional video sequence or image and/or other visual overlays.

As illustrated in block 44, the apparatus 20 includes means, such as the processing circuitry 22, the communications interface 26 or the like, for rendering the omnidirectional video sequence or image and the visual overlay.

As illustrated in block 46, the apparatus 20 includes means, such as the processing circuitry 22, the communications interface 26 or the like, for receiving a user interaction associated with the visual overlay. The user interaction received may be any of the user interactions described in conjunction with FIG. 3.

As illustrated in block 48, the apparatus 20 includes means, such as the processing circuitry 22, the communications interface 26 or the like, for adjusting the rendering of the visual overlay based on the user interaction and the overlay metadata file. The user interaction may be one of the following:
 move or swipe the overlay to a different viewport
 move or swipe the overlay to a different viewpoint or freeze the overlay onto the viewport regardless of viewpoint changes
 move or push or pull the overlay to a different depth
 move the overlay flexibly to any position
 rotate the overlay along yaw, pitch and roll directions
 resize the overlay window
 change the field-of-view of the overlay
 change the transparency or opacity of the overlay
 switch ON/OFF the overlay
 scroll the scene within the overlay window
 magnify the overlay
 control the volume of audio associated with the overlay, e.g., by increasing the volume when the overlay is being watched
 slice the overlay (e.g., horizontally or vertically or other predefined direction)
 crop the overlay (so as to only make a portion of the overlay visible to the viewer)

The user interaction definition file in the overlay metadata file may define whether to allow or disallow the user interaction received. If the user interaction received is a type of user interaction allowed in the user interaction definition file, the apparatus 20 will adjust rendering of the visual overlay accordingly. If the user interaction is a type of user interaction disallowed in the user interaction definition file, then the apparatus 20 will not adjust rendering of the visual overlay based on the user interaction.

Referring now to FIG. 5, the operations performed, such as by the apparatus 10 of FIG. 2 embodied by or otherwise associated with a source computing device are depicted. As shown in block 50, the apparatus includes means, such as the processing circuitry 12 or the like, for defining a group of overlays to background media content, such as omnidirectional media content. In an example embodiment, the overlays that are grouped are semantically correlated overlays that all relate to the same background media content and convey the same general content, but represent content with different levels of detail, such as different fields of view and/or different resolutions. Although a wide variety of different types of semantically correlated overlays may be provided, examples of semantically correlated overlays include video overlay tracks with different fields of view and/or different resolutions, overlay image items with different fields of view and/or different resolutions, textual information, graphical information, point cloud coded objects or the like. In another example embodiment, the overlays may provide different choices of content, such as the presentation of different movies, programs or channels on a television or other display that is included within a virtual reality environment or the presentation of a different collection of photographs that may be browsed in a virtual reality environment. By way of example, but not of limitation, groups of semantically correlated overlays are generally described below.

The apparatus 10 of an example embodiment also optionally includes means, such as the processing circuitry 12, the communication interface 16 or the like, for causing metadata relating to the group of overlays to be provided, such as to a client computing device. See block 52. Alternatively, the metadata relating to the group of overlays could be derived by the client computing device based on, e.g., media properties, such as resolution, bandwidth, codec, etc. In an embodiment in which the metadata is provided, the metadata not only identifies a respective overlay, but provides additional information regarding the overlay. Various types of metadata may be provided with respect to a group of semantically correlated overlays. In an example embodiment, the metadata includes information regarding the bandwidth required for the alternative overlays of the group of semantically correlated overlays. In this regard, the alternative overlays may require different amounts of bandwidth to transmit the overlay from the source computing device to the client computing device with video overlay tracks generally requiring more bandwidth than overlay image items which, in turn, generally require more bandwidth than an overlay that provides textual information. Additionally or alternatively, the metadata may include information regarding the resolution of the alternative overlays of the group of semantically correlated overlays. Like the bandwidth, the alternative overlays may have different resolutions and may therefore provide for different levels of user enjoyment. However, overlays with increased resolution generally require additional network resources, e.g., bandwidth, and processing resources to transmit and present the overlay relative to lower resolution overlays. In some embodiments, the metadata may be included and/or provided as the overlay metadata file previously described in conjunction with FIG. 3.

Additionally or alternatively, the metadata may include information regarding the fidelity of the alternative overlays of the group of semantically correlated overlays. Although fidelity may be defined in various manners, the information regarding the fidelity of the alternative overlays may be provided in terms of a fidelity ranking in one example embodiment. Based on the fidelity ranking, a client can determine the relative relationship between the fidelity of the different overlays. With respect to the example of FIG. 1, the video Overlay 1 having the full field of view has the highest fidelity, video Overlay 2 having a limited field of view of the commentator face has the second highest fidelity, Overlay 3 providing a still image of the commentator face has the third highest fidelity and Overlay 4 that includes textual information has the lowest relative fidelity. The overlays may represent different content choices.

As shown in block 54 of FIG. 5, the apparatus 10 of an example embodiment of the source computing device includes means, such as the processing circuitry 12, communication interface 16 or the like, for receiving a selection, such as the client's selection, of the respective overlay from the group of overlays. In response to the selection, the apparatus of this example of embodiment includes means, such as the processing circuitry, the communication interface or the like, for causing the respective overlay that has been selected, such as by the client, to be provided to the client. The other alternative overlays of the group of overlays that were not selected by the client need not be downloaded to the client computing device, thereby conserving network resources as well as processing resources of both the source computing device and the client computing device.

As shown in block 56, the apparatus 10 of an example embodiment also optionally includes means, such as a processing circuitry 12, the communication interface 16 or the like, for causing the respective overlay to be provided.

As shown in block 58, the apparatus 10 of an example embodiment also optionally includes means, such as a processing circuitry 12, the communication interface 16 or the like, for causing the background media content to be provided. The background media content may be provided at any point in the sequence of operations depicted in FIG. 5 including concurrent with the provision of the selected overlay or before or after the provision of the selected overlay. Alternatively, the client computing device may be configured to assume the color or content of the background media content, thereby rendering the provision of the background media content unnecessary. In some embodiments, the operations described in FIG. 3 above may also be combined with the operations described in FIG. 5.

The provision of the metadata relating to the group of overlays may be provided in a variety of different manners. In an example embodiment, however, the metadata related to the group of overlays is provided by one or more data structures and related control flags at the file format level. In this example embodiment in which the background media content is omnidirectional media content, the metadata relating to the group of overlays may be provided and stored as in an International Organization for Standardization Base Media File Format (ISOBMFF) compliant file. A basic building block in the ISOBMFF is called a box. Each box has a header and a payload. The box header indicates the type of box and the size of the box in terms of bytes. Box type is typically identified by an unsigned 32-bit integer, interpreted as a four character code (4CC). A box may enclose other boxes, and the ISO file format specifies which box types are allowed within a box of a certain type. In this example embodiment, an EntityToGroupBox file may be defined to provide the metadata relating to the group of semantically correlated overlays. The EntityToGroupBox file may include a grouping_type that has a predefined value, such as 'oval', that indicates that each track or item in the group is an alternative to be rendered as an overlay. From among the alternative overlays identified by the EntityToGroupBox, only one of the overlays is intended to be presented along with the background media content, as well as any other overlays from other groups of overlays. The alternative overlays may be user-switchable.

In one example embodiment, a ranking of the alternative overlays of a group is provided by the order of the overlays, e.g., the track identifiers or image item identifiers, in the EntityToGroupBox. The order of the appearance of track identifier or image item identifier can be used by the client computing device as a form of metadata to select the alternative overlay to be presented along with the background media content. This embodiment suggests to the client computing device the content consumption sequence. For example, an e-learning tutorial overlay could include the different chapters in a particular order in the EntityToGroupBox with the introductory chapter preceding a more detailed chapter in the EntityToGroupBox so as to thereby suggest to the client computing device that the introductory chapter be presented prior to the more detailed chapter.

Each track, such as each video, in the group of overlays may be represented by an OverlayConfigBox within a ProjectOmniVideoBox associated with the respective track. Similarly, each image item in the group of overlays may also have an OverlayConfigBox in the ItemPropertyContainerBox of the respective image item. In order to indicate that the overlays, such as the tracks or image items, in the EntityToGroupBox having a grouping_type of a predefined value, such as 'oval', are alternatives, each overlay may have the same value of alternate_group in the TrackHeaderBox or may belong to the same sub-picture composition track group. In an example embodiment, any of the alternative overlays, such as tracks or image items, in the same EntityToGroupBox having a grouping_type of a predefined value, such as 'oval', shall also belong to the same entity group, such as the "altr" entity group.

In an example embodiment, the metadata related to a respective overlay of the group of overlays may be provided as follows:

```
aligned(8) class SingleOverlayStruct( ) {
    unsigned int(16) overlay_id;
    unsigned int(8) overlay_fidelity_ranking;
    unsigned int(16) overlay_bandwidth;
    for (i = 0; i < num_flag_bytes * 8; i++)
        unsigned int(1) overlay_control_flag[i];
    for (i = 0; i < num_flag_bytes * 8; i++){
        if (overlay_control_flag[i]) {
            unsigned int(1) overlay_control_essential_flag[i];
            unsigned int(15) byte_count[i];
            unsigned int(8) overlay_control_struct[i][byte_count[i]];
        }
    }
}
```

In this example embodiment, the overlay_id uniquely identifies the respective overlay, and the overlay_fidelity_ranking is a value, such as integer value, specifying the rank of the respective overlay among the group of overlays. The fidelity ranking may be subjective and may be provided, for example, by the creator of the content, such as based on content analysis, a subjective evaluation or professional judgment. In terms of content analysis, the fidelity ranking may take into account the presence or absence of a person of interest, the presence or absence of an object of interest or the like with the presence of a person of interest or an object of interest resulting in a greater fidelity ranking than if the person or interest or object of interest were not present. By way of example relative to the football game of FIG. 1C, an overlay showing a replay of a handball offense is likely to be best viewed as a video and to be least interesting in terms of textual information. Thus, the fidelity ranking of a video of the handball offense will be greater than the fidelity ranking of the corresponding textual information. On the other hand, a stock market ticker provides substantially useful information compared to the video of a television presenter providing the same information and, in some instances, the video of the television presenter may be distracting, such as in instances in which the background video content is the presentation of a different television channel. Consequently, the textual information representative of the stock market ticker may have a higher fidelity ranking than the corresponding video presentation. As the foregoing example demonstrates, the determination of the fidelity ranking may also take into account the type of background media content with which the overlay is to be concurrently presented.

The fidelity ranking may provide orthogonal information relative to the priority information, e.g., overlay_priority, associated with each overlay. overlay_priority indicates which overlay should be prioritized in an instance in which the client computing device is unable to decode all overlays, such as in an instance in which the client computing device lacks sufficient decoding capacity. In this regard, the priority information enables the selection of one overlay which is prioritized for rendering over another overlay, while the fidelity ranking facilities the selection of a particular overlay from among a single group of overlays.

Additionally, the overlay_bandwidth provided by the foregoing example of metadata associated with an overlay is a value, such as an integer value, that specifies the bit rate, such as the average bit rate, e.g., the average bit rate in kilobits per second, required for downloading the overlay from the source computing device to the client computing device. In some embodiments, the overlay_bandwidth may represent the peak bit rate value required during downloading the overlay from the source computing device to the client computing device.

In an example embodiment, multiple alternative tracks may be rendered for a respective overlay. In an example embodiment, the OverlayConfigBox corresponding to the same overlay, that is, an overlay having the same overlay properties, may be present in more than one media track in an alternative_group. The inclusion of overlays having the same properties in multiple alternative tracks is different from the grouping of multiple overlay alternatives with different overlay properties due to the added flexibility of taking into account the different image/video resolution or timed-text dimensions In another embodiment of the grouping of overlays that are alternatives for switching, an EntityToGroupBox of the type shown below with a grouping_type equal to 'oval' indicates that this track or item is an overlay track/item that is intended to be presented as a client-switchable alternative for an overlay track/item in the same entity group.

```
aligned(8) class OverlaySwitchAlternativesBox(version, flags)
extends EntityToGroupBox('oval', version, flags) {
    // conditionally optional
    for(i=0; i<num_entities_in_group; i++)
        unsigned int(16) ref_overlay_id[i];
}
```

In this example, ref_overlay_id[i] specifies the overlay_id from the track or image item identified by i-th entity_id that is a switchable overlay in this group. The i-th referenced track or image item shall have an overlay_id equal to the ref_overlay_id[i] that is present. When each of the tracks and image items identified by the entity_id values of this entity group contains exactly one overlay, it is allowed to have no ref_layer_id[i] syntax elements present.

In an example embodiment, the order of listing the overlays in an entity group, such the 'oval' entity group, conveys additional information, such as by having predefined or indicated semantics. In an example, an ascending order of the listing of the overlays (e.g., an ascending order of i in ref_overlay_id[i], when present) specifies the forward/upward switching order. In other words, when the user or client switches forward/upward from the overlay with an overlay_id equal to ref_overlay_id[i], the next overlay to be displayed has an overlay_id equal to ref_overlay_id[i+1] in an instance in which there is no wrapover from the last value of i to 0.

If the alternative overlay selection is done based on client interaction, the overlay selecton can be implemented, for example, by extending the class OverlayInteraction as follows:

```
aligned(8) class OverlayInteraction ( ) {
    unsigned int(1) change_position_flag;
    unsigned int(1) change_depth_flag;
    unsigned int(1) switch_on_off_flag;
    unsigned int(1) change_opacity_flag;
    unsigned int(1) resize_flag;
    unsigned int(1) source_switching_flag;
    bit(2) reserved = 0;
}
```

In this example, the source_switching_flag, when set to 1, specifies that the client is allowed to switch to a new overlay from the current overlay. When set to 0, the source_switching_flag specifies that the client is not allowed to switch to a new overlay from the current overlay.

In another embodiment, the switching of the overlay can be implemented by defining a new structure called the OverlaySwitchingSequence( ) with the following syntax:

```
aligned(8) class OverlaySwitchingSequence ( ) {
    if (source_switching_flag){
        unsigned int(1) forward_switch;
            unsigned int(1) backward_switch;
    }
    bit(6) reserved = 0;
    if(forward_switch)
        unsigned int(32) fwd_switch_track_ref_idx;
    else if (backward_switch)
        unsigned int(32) bwd_switch_track_ref_idx;
}
```

In this example, forward_switch, when set to 1, specifies that when the client switches forward/upward, the corresponding overlay track/item as specified by fwd_switch_track_ref_idx is selected. In addition, backward_switch, when set to 1, specifies that when client switches backward/downward then the corresponding overlay track/item as specified by bwd_switch_track_ref_idx is selected. Further, fwd_switch_track_ref_idx is a 1-based index to the list of track IDs/Items contained in the EntityToGroupBox with a grouping_type equal to 'oval'. Finally, bwd_switch_track_ref_idx is a 1-based index to the list of track IDs/Items contained in the EntityToGroupBox with grouping_type equal to 'oval'.

Referring now to FIG. 6 from the perspective of the client computing device, the apparatus 10 embodied or otherwise associated with the client computing device includes means, such as the processing circuitry 12, the communication interface 16 or the like, for receiving, such as from a source computing device, metadata defining a group of overlays to the background media content. See block 60 of FIG. 6. As described above, the group of overlays may comprise a group of semantically correlated overlays including alternative overlays representing content relating to the same background media content and conveying the same general content, but with different levels of detail. Alternatively, the group of overlays may provide different choices of content, such as the presentation of different movies, programs or channels on a television or other display that is included within a virtual reality environment or the presentation of a different collection of photographs that may be browsed in a virtual reality environment. Although a wide variety of metadata may be provided as described above, the metadata of an example embodiment in which the group of overlays includes semantically correlated overlays includes information regarding the bandwidth required for the alternative overlays of the group of semantically correlated overlays to be downloaded, information regarding the resolution of the alternative overlays of the group of semantically correlated overlays and/or information regarding the fidelity of the alternative overlays of the group of semantically correlated overlays. In some embodiments, the metadata may be included and/or provided as the overlay metadata file previously described in conjunction with FIG. 3.

Referring to block 62 of FIG. 6, the apparatus 10 of this example embodiment also includes means, such as the processing circuitry 12, the user interface 18 or the like, for causing a selection of a respective overlay from the group of overlays to be provided. In this regard, the selection may be made by the user or may be made automatically, such as by the client computing device, based upon, for example, predefined rules that take into account and evaluate the metadata that is provided relating to the alternative overlays of the group of overlays. For example, the client computing device may base the selection upon the network bandwidth requirements, the image or video resolution and/or user preferences. In one embodiment, for example, the client computing device may require the selected overlay to require no more than a predefined maximum bandwidth or at least to have a predefined minimum resolution and/or at least a predefined fidelity ranking.

After having provided the selection of a respective overlay to the source computing device, the apparatus 10 of this example embodiment includes means, such the processing circuitry 12, the communication interface 16 or the like, for receiving the respective overlay. See block 64. As shown in block 66 of FIG. 6, the apparatus also optionally includes means, such as the processing circuitry, the communication interface or the like, for receiving the background media content. In this regard, the client computing device may receive the background media content concurrent with the respective overlay or at some other point in time, such as prior to receiving the respective overlay or following receipt to the respective overlay. Alternatively, the background media content may be generated implicitly by the client computing device without provision of the background media content by the source computing device. Thereafter, the apparatus of this example embodiment includes means, such the processing circuitry, the user interface 18 or the like, for causing the background media content and the respective overlay to be concurrently presented. See block 68. Thus, the user experience may be enhanced by tailoring the overlay that is concurrently presented with the background media content to the client. However, network resources and processing resources of both the source computing device and the client computing device may be conserved by permitting a selection of the respective overlay to be based upon metadata for all of the overlays of the group of overlays while only requiring the respective overlay that is selected to be downloaded from the source computing device to the client computing device.

The operations described in FIG. 4 above may also be combined with the operations described in FIG. 6, in particular, in some embodiments, operations 46 and 48 described above may be added.

The apparatus 20 may include means, such as the processing circuitry 22, the communications interface 26 or the like, for receiving a user interaction associated with the respective visual overlay. The user interaction received may be any of the user interactions described in conjunction with FIG. 3.

The apparatus 20 may include means, such as the processing circuitry 22, the communications interface 26 or the like, for adjusting the rendering of the respective visual overlay based on the user interaction and the overlay metadata file. The user interaction may be one of the following:
  move or swipe the overlay to a different viewport
  move or swipe the overlay to a different viewpoint or freeze the overlay onto the viewport regardless of viewpoint changes
  move or push or pull the overlay to a different depth
  move the overlay flexibly to any position
  rotate the overlay along yaw, pitch and roll directions
  resize the overlay window
  change the field-of-view of the overlay
  change the transparency or opacity of the overlay
  switch ON/OFF the overlay
  scroll the scene within the overlay window
  magnify the overlay
  control the volume of audio associated with the overlay, e.g., by increasing the volume when the overlay is being watched
  slice the overlay (e.g., horizontally or vertically or other predefined direction)
  crop the overlay (so as to only make a portion of the overlay visible to the viewer)

The user interaction definition file in the overlay metadata file may define whether to allow or disallow the user interaction received. If the user interaction received is a type of user interaction allowed in the user interaction definition file, the apparatus 20 will adjust rendering of the visual overlay accordingly. If the user interaction is a type of user interaction disallowed in the user interaction definition file, then the apparatus 20 will not adjust rendering of the visual overlay based on the user interaction.

As described above, FIGS. 3, 4, 5, and 6 are flowcharts of an apparatus 20, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by processing circuitry 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 3, 4, 5 and 6. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

That which is claimed:

1. A method comprising:
receiving metadata defining a group of overlays providing different choices of overlay content to background media content, wherein the metadata comprises (i) sequence information of overlays among the group of overlays and (ii) a plurality of user definition files comprising allowed user interactions and disallowed user interactions with a respective overlay of the group of overlays, and wherein the sequence information specifies a predefined order in which an overlay within the group of overlays is able to be selected;
causing a selection of a respective overlay from the group of overlays to be provided, wherein the selection of the respective overlay is based on the respective overlay being next in the predefined order; and
receiving the respective overlay for presentation concurrent with the background media content.

2. The method according to claim 1 further comprising:
receiving the background media content, wherein the background media content comprises omnidirectional media content; and
causing the omnidirectional media content and the respective overlay to be concurrently presented.

3. The method according to claim 1, further comprising:
receiving a user interaction associated with the overlay, wherein the user interaction corresponds with a flag defining a user interaction type in the metadata; and
adjusting the rendering of the overlay based on the user interaction and the metadata in an instance where the flag indicates that the user interaction type is allowed.

4. The method according to claim 1, wherein the sequence information comprises order of listing the overlays in an entity group and conveys additional information.

5. The method according to claim 1, wherein the metadata defining the group of overlays and the background media content are contained in a single bitstream.

6. The method according to claim 1, wherein the allowed user interactions and the disallowed user interactions within the plurality of user definition files comprise one or more of: (i) moving or swiping an overlay to a different viewport, (ii) moving, pushing, or pulling the overlay to a different depth, (iii) rotating the overlay along a horizontal axis or a vertical axis, (iv) resizing the overlay, (v) magnifying the overlay, (vi) changing the transparency or opacity of the overlay, (vii) setting the overlay to be on or off, (viii) scrolling a scene within a window of the overlay, (ix) changing a volume of audio associated with the overlay, (x) slicing the overlay vertically or horizontally, or (xi) cropping the overlay.

7. The method according to claim 1, wherein the respective overlay is presented to overlap with the background media content partially or fully.

8. An apparatus comprising at least one processor and at least one memory including computer program code, the at least one memory and the computer program code configured to, with the at least one processor, cause the apparatus to:
receive metadata defining a group of overlays providing different choices of overlay content to background media content, wherein the metadata comprises (i) sequence information of overlays among the group of overlays and (ii) a plurality of user definition files comprising allowed user interactions and disallowed user interactions with a respective overlay of the group of overlays;
cause a selection of a respective overlay from the group of overlays to be provided; and
receive the respective overlay for presentation concurrent with the background media content.

9. The apparatus according to claim 8, wherein the at least one memory and the computer program code are further configured to, with the at least one processor, cause the apparatus to receive the background media content, wherein the background media content comprises omnidirectional media content.

10. The apparatus according to claim 9, wherein the at least one memory and the computer program code are further configured to, with the at least one processor, cause the apparatus to cause the omnidirectional media content and the respective overlay to be concurrently presented.

11. The apparatus according to claim 8, wherein the at least one memory and the computer program code are further configured to, with the at least one processor, cause the apparatus to:
receive a user interaction associated with the overlay, wherein the user interaction corresponds with a flag defining a user interaction type in the metadata; and
adjust the rendering of the overlay based on the user interaction and the metadata in an instance where the flag indicates that the user interaction type is allowed.

12. The apparatus according to claim 8, wherein the sequence information comprises order of listing the overlays in an entity group and conveys additional information.

13. A method comprising:
causing metadata to be provided to a client computing device, wherein the metadata defines a group of overlays providing different choices of overlay content to background media content and comprises (i) sequence information of overlays among the group of overlays and (ii) a plurality of user definition files comprising allowed user interactions and disallowed user interactions with a respective overlay of the group of overlays, and wherein the sequence information specifies a predefined order in which an overlay within the group of overlays is able to be selected; and
causing the client computing device to select an overlay from the group of overlays based on the metadata, wherein the selection of a respective overlay is based on the respective overlay being next in the predefined order.

14. The method according to claim 13, wherein the background media content comprises omnidirectional media content.

15. The method according to claim 13, wherein the metadata comprises a flag defining a user interaction type.

16. The method according to claim 15, wherein the flag indicates that the user interaction type is allowed.

17. The method according to claim 13, wherein the sequence information comprises order of listing the overlays in an entity group and conveys additional information.

18. An apparatus comprising at least one processor and at least one memory including computer program code, the at least one memory and the computer program code configured to, with the at least one processor, cause the apparatus to:
cause metadata to be provided to a client computing device, wherein the metadata defines a group of overlays providing different choices of overlay content to background media content and comprises (i) sequence information of overlays among the group of overlays and (ii) a plurality of user definition files comprising allowed user interactions and disallowed user interactions with a respective overlay of the group of overlays, and wherein the sequence information specifies a predefined order in which an overlay within the group of overlays is able to be selected; and cause the client computing device to select an overlay from the group of overlays based on the metadata, wherein the selecting of a respective overlay is based on the respective overlay being next in the predefined order.

19. The apparatus according to claim 18, wherein the background media content comprises omnidirectional media content.

20. The apparatus according to claim 18, wherein the metadata comprises a flag defining a user interaction type.

21. The apparatus according to claim 20, wherein the flag indicates that the user interaction type is allowed.

22. The apparatus according to claim 18, wherein the sequence information comprises order of listing the overlays in an entity group and conveys additional information.

* * * * *